Feb. 5, 1935. A. J. MEYER 1,989,816
ENGINE
Filed March 9, 1932
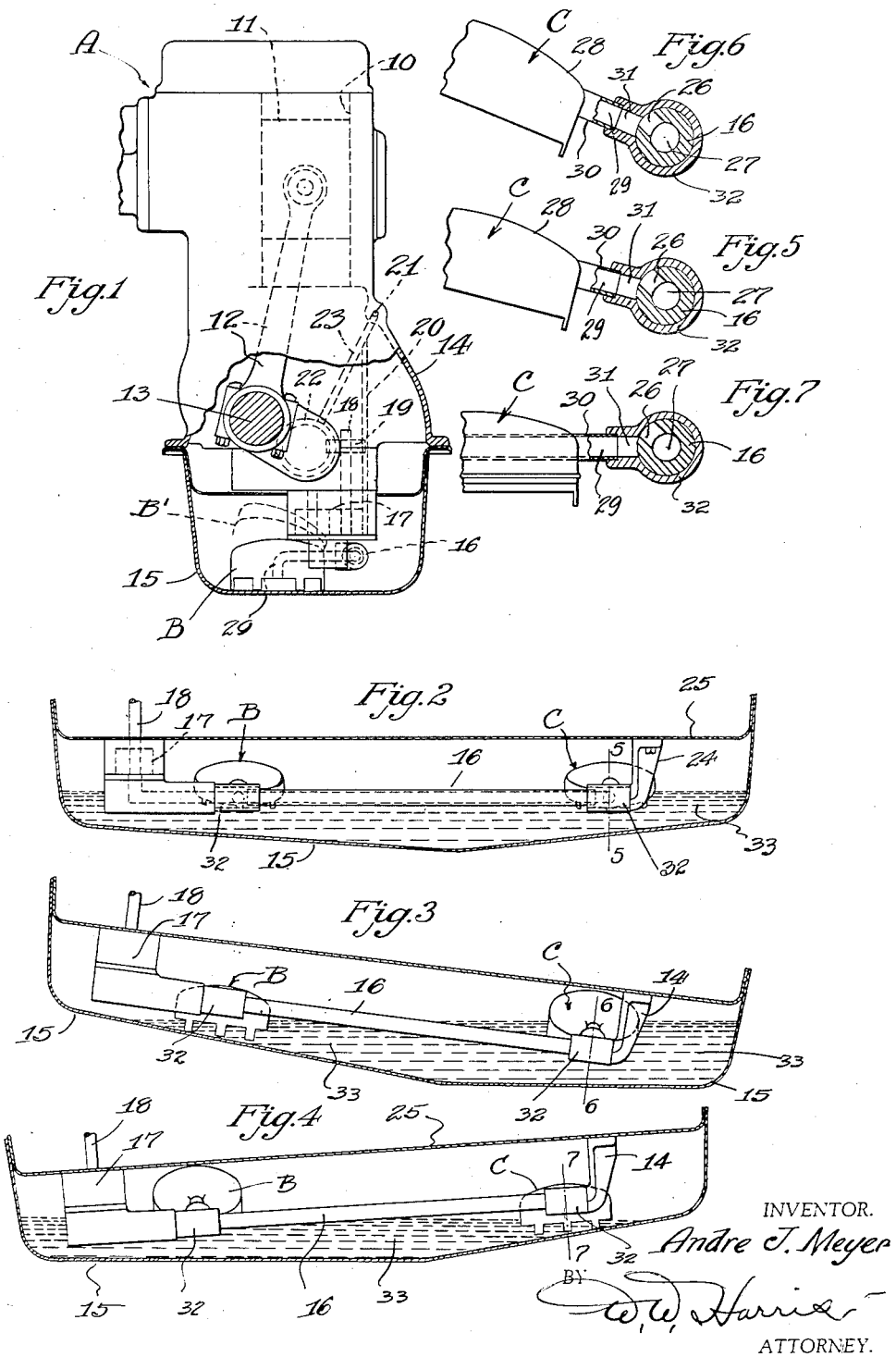
INVENTOR.
Andre J. Meyer
BY
W. W. Harris
ATTORNEY.

Patented Feb. 5, 1935

1,989,816

UNITED STATES PATENT OFFICE 1,989,816

ENGINE

Andre J. Meyer, Detroit, Mich., assignor to Continental Motors Corporation, Detroit, Mich., a corporation of Virginia Application March 9, 1932, Serial No. 597,861

8 Claims. (Cl. 184—6)

This invention relates to internal combustion engines and refers more particularly to improvements in lubrication systems and devices for such engines.

It is an object of my invention to provide improved means for insuring adequate lubrication for the engines, especially under conditions where the engine is inclined or tilted. Such tilting of the engine is commonly experienced where the engine is mounted in a motor vehicle and where such vehicle is travelling in mountainous or hilly country which tends to tilt the engine and crankcase reservoir so as to cause the oil to collect for the most part in one end of the reservoir.

It has been proposed before to draw the oil from a reservoir at opposite ends thereof and to control the intake at such ends by means of gravity actuated ball valves or the like. Such ball valves are subject to inertia lag and improper closing by reason of foreign substances tending to collect at the valve seat in which instances the lubricating system will not work satisfactorily. It will be understood that in systems of this general character, it is necessary to close the intake passage for the lubricant at the crankcase and where the lubricant level has been reduced to the point where lubricant is not withdrawn at such end, in order that the lubricant pump will not draw air through its intake conduit but will draw in the lubricant from the opposite end of the reservoir which by reason of the inclination contains an adequate supply of the lubricant.

It is an object of my invention to provide means for overcoming the aforesaid difficulties and in the embodiment illustrating the principles of my invention I have disclosed one or more intake elements adapted to float on the lubricant and where the floating element controls a valve so that as the float approaches the bottom of the reservoir the valve controlling lubricant supply to the pump will be closed. In this connection a further advantage obtained by my invention resides in the provision of a lubricant intake passage carried by the float whereby lubricant drawn from the reservoir is taken from the top of the lubricant level where the oil is the cleanest, the sediment naturally collecting at the bottom of the reservoir. In carrying out my invention with respect to the tilting feature aforesaid, I preferably provide a pair of my floating intake elements wherein a float is located at each end of the crankcase. As the engine is tilted in either direction an adequate supply of lubricant is insured since if the tilting is sufficient to drain one end of the crankcase, then the float associated with such end will automatically close off that end of the lubricant intake system and the other end will adequately supply the pump.

It is a further object of my invention to provide improvements in engine lubricating devices wherein lubricant is supplied from the surface region of the lubricant in the reservoir and wherein the supply of lubricant to the oil pump will be shut off when the lubricant level drops a predetermined subnormal amount.

Further objects and advantages of my invention will be apparent as this specification progresses, reference being had to the accompanying drawing in which:

Fig. 1 is an end elevation view of a typical internal combustion engine with the crankcase parts broken away to illustrate my lubricant control device, Fig. 2 is a sectional elevational view through the crankcase reservoir longitudinally thereof illustrating the lubricant control device for normal lubricant level, Fig. 3 is a view of the lubricant reservoir in Fig. 2 with the parts positioned for engine tilting, Fig. 4 is a view corresponding to Fig. 3 showing the parts positioned for engine tilting opposite to that illustrated in Fig. 3, Fig. 5 is a detail sectional view through the float pivot showing the control valve positioned as in Fig. 2, the section being taken along the line 5—5 of Fig. 2, Fig. 6 is a view corresponding to Fig. 5 but showing the float positioned for abnormal lubricant level, the view being taken along the line 6—6 of Fig. 3, and Fig. 7 is a view corresponding to Figs. 5 and 6 but showing the valve in its closest position, this view being taken along the line 7—7 of Fig. 4.

Referring to the drawing, reference character A represents the internal combustion engine having the usual spaced cylinders, one of which is indicated at 10 and the usual pistons 11 operating connecting rods 12 extending to crankshaft 13 adapted for rotation in the engine crankcase structure 14, the latter being provided with the lubricant reservoir or oil pan 15. Mounted within the crankcase reservoir 15 is a conduit or pipe 16 extending longitudinally of the reservoir for conducting lubricant from opposite ends thereof to an oil pump 17 operated by a shaft 18 geared at 19 so as to be driven from crankshaft 13. The lubricant under pressure is delivered from pump 17 through passage 20 to the usual gallery 21 whence the oil passes to the various engine parts to be lubricated, such as the crankshaft bearings 22 communicating with gallery 21 by passage 23.

The pipe 16 is supported at one end by a bracket 24 secured to the tray 25 or other part of the engine structure. The tray 25 does not form a part of this invention since it is described and claimed in my co-pending application, Serial No. 541,197 filed June 1, 1931. The pipe 16 at each end of the reservoir 15 is provided with a valve port 26 communicating with the lubricant passage 27 of pipe 16. The pipe 16 is secured against rotation and is adapted to pivotally mount at each end thereof the lubricant intake means or intake elements B and C which are adapted to float on the lubricant.

The floats B and C are similar in construction and one will be described in detail as follows. Referring to Figs. 5 and 6 the float C is formed with a hollow metallic body portion 28 so that it will float on the lubricant and thereby at all times position the intake conduit or passage 29 in the region of the lubricant level, the passage 29 extending through hollow arm 30 and thence to a valve port 31 formed in collar 32 which surrounds pipe 16 so that ports 26 and 31 cooperate to provide valve means for controlling the passage of lubricant from intake conduit 29 to passage 27 of pipe 16.

In Figs. 2 and 5 the floats B and C are illustrated for position of normal level of lubricant 33. This position of the floats is indicated by the dotted line B' in Fig. 1 and from Fig. 5 it will be noted that ports 31 and 26 are in communication so that the oil pump 17 will draw oil from each end of the crankcase reservoir 15 for passage to the various engine parts to be lubricated.

Assuming that the engine is tilted as in climbing a hill where the engine is mounted in a motor vehicle, then the reservoir 15 will be inclined as illustrated in Fig. 3 and the float C will swing on its pivot upwardly from the bottom of the reservoir so as to open ports 31 and 26 to a greater extent as illustrated in Fig. 6. At the same time, the float B will approach the bottom of the reservoir so as to swing downwardly on its pivot and in Fig. 3 the float B is shown resting on the bottom of the reservoir in which case the port 31 is moved beyond the associated port 26 so as to shut off the supply of lubricant from this end of the crankcase as will be noted from Fig. 7. The pump 17 is now drawing its full supply of lubricant from the intake conduit 29 associated with float C. When the level of the lubricant is again restored in the region of float B then the valve means associated therewith will again open and the oil pump will draw lubricant through the float B as well as through float C as will be readily understood. In Fig. 3 the oil level is abnormal in the region of float C which will position such float as shown in Fig. 6 and the oil level is subnormal in the region of float B.

In Fig. 4 the inclination of the reservoir is reversed so that the valve means of float C closes delivery of lubricant to the oil pump from the end of the reservoir having the subnormal level, the lubricant being passed to the oil pump by means of the float B.

It will be noted that I have provided a very effective and simple means for insuring an adequate supply of lubricant to the oil pump regardless of the inclination of the lubricant reservoir and further that the lubricant supplied to the reservoir is always taken from the region of the lubricant at the surface thereof.

Various modifications and deviations will be apparent from my disclosure and it is not my intention to limit my invention to the specific structures and arrangement of parts as illustrated and described.

What I claim as my invention is:

1. In a lubrication device for an internal combustion engine of the type adapted to be inclined in use, a crankcase reservoir for storing lubricant, a conduit within the reservoir having spaced intake openings and delivering lubricant from the reservoir to an engine part, means for conducting lubricant from the reservoir to said conduit, said means including intake elements adapted to float on the lubricant, said intake elements being spaced in the direction of said inclination, and valves for said conduit and actuated in response to movement of the respective intake elements, said valves being supported externally of said conduit whereby to normally render said conduit free from obstructions for unrestrictedly conducting lubricant.

2. An engine lubricating device comprising, a lubricant reservoir, a pair of floats spaced in said reservoir, each of said floats having a lubricant conduit associated therewith, means including a second conduit for conducting lubricant from said float conduits to an engine part, and means actuated in response to and by movement of either of said floats for controlling passage of lubricant from the float conduit to said second conduit, said last means supported externally of said second conduit whereby to normally render said second conduit free of obstructions to unrestrictedly conduct lubricant.

3. In an engine lubricating device, a reservoir for lubricant, a conduit, a float externally pivoted to said conduit and having a lubricant intake passage associated therewith, a pump for conducting lubricant from said conduit to an engine part, said pivot providing a valve controlling the communication between said conduit and said lubricant intake passage in response to and actuated by movement of said float.

4. In an engine lubricating system, a crankcase lubricant reservoir, a pipe extending longitudinally of said reservoir and having spaced intake openings, a float at each end of said reservoir having a lubricant intake passage cooperating with an intake opening, means pivoting said floats externally on said pipe, and means for conducting lubricant under pressure from said pipe to an engine part, said pipe communicating with said intake passages.

5. In an engine lubricating system, a crankcase lubricant reservoir, a pipe extending longitudinally of said reservoir, a float at each end of said reservoir having a lubricant intake passage associated therewith, means pivoting said floats externally on said pipe whereby to normally render said pipe free to unrestrictedly conduct lubricant, and means for conducting lubricant under pressure from said pipe to an engine part, said float pivoting means having lubricant passages communicating with the said intake passage of the float associated therewith and with said pipe, and means for conducting lubricant under pressure from said pipe to an engine part.

6. In an engine lubricating system, a crankcase lubricant reservoir, a pipe extending longitudinally of said reservoir, a float at each end of said reservoir having a lubricant intake passage associated therewith, means pivoting each of said floats externally on said pipe, and means for conducting lubricant under pressure from said pipe to an engine part, said pipe communicating with said intake passages, and valve means actuated by said floats for selectively closing said intake passages, said valve means supported externally of said pipe whereby to render said pipe free to unrestrictedly conduct lubricant.

7. In a lubricating system for an internal combustion engine of the type adapted to be longitudinally tilted while being operated, a crankcase for storing lubricant, a pump, a conduit openingly communicating with said pump and having a plurality of lubricant intake openings spaced longitudinally of said crankcase, and means controlling the intake of lubricant to said conduit and including intake devices supported externally of the conduit, one for each conduit intake opening, said devices including a lubricant intake passage and a float buoyantly sustained by the lubricant in the crankcase and a valve element movably supported and controlling the communication between said intake passage and said conduit, said valve element being actuated by said float for closing off the communication between said conduit and passage when the level of lubricant in the crankcase falls to a predetermined level.

8. In a lubricating system for an internal combustion engine of the type adapted to be longitudinally tilted while being operated, a crankcase for storing lubricant, a pump, a conduit openingly communicating with said pump and having a plurality of lubricant intake openings spaced longitudinally of said crankcase, and means controlling the intake of lubricant to said conduit and including intake devices supported externally of the conduit, one for each conduit intake opening, said devices including a lubricant intake passage and a float buoyantly sustained by the lubricant in the crankcase, and a valve element actuated by said float for controlling the communication between said passage and said conduit, said valve element closing off the communication between said conduit and passage when the level of lubricant in the crankcase falls to a predetermined level, said intake devices being spaced in the direction of said inclination.

ANDRE J. MEYER.